H. T. MARSHALL.

BOOT AND SHOE NAILS.

No. 7,402. Reissued Nov. 28, 1876.

WITNESSES.

Robert Mitchell

Geo. H. Bard

INVENTOR.

H. T. Marshall

Per Brown Bros

Attorneys

THE GRAPHIC CO. N.Y.

UNITED STATES PATENT OFFICE.

HOWARD T. MARSHALL, OF BROCKTON, MASSACHUSETTS.

IMPROVEMENT IN BOOT AND SHOE NAILS.

Specification forming part of Letters Patent No. 156,061, dated October 20, 1874; reissue No. 7,402, dated November 28, 1876; application filed November 23, 1875.

*To all whom it may concern:*

Be it known that I, HOWARD T. MARSHALL, of Brockton, in the county of Plymouth and State of Massachusetts, have invented new and useful Improvements in Nails for Boots and Shoes, of which the following is a specification:

This invention relates to improvements in nails more especially intended for boots and shoes; and consists, first, of a nail which has two flat sides, opposite to and parallel, or substantially so, with each other, a corrugated or indented edge connecting such flat sides, and a tapering and clinching point at one end, and an enlarged head at the other end, all substantially as hereinafter described; secondly, of a nail which has two flat sides, opposite to and parallel, or substantially so, with each other, an edge connecting such flat sides which tapers in the length of the nail, and also an edge which is corrugated or indented, and an enlarged head at one end, with or without a clinching-point at the other end, all substantially as hereinafter described.

In the accompanying plate of drawings my improved nail is illustrated.

Figure 1:
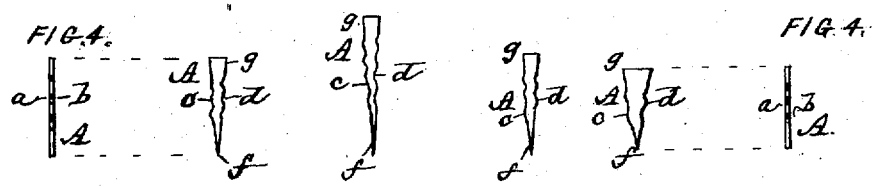
Figure 2:
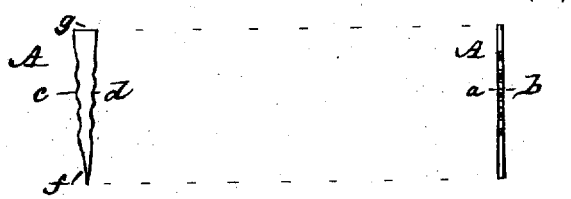
Figure 3:
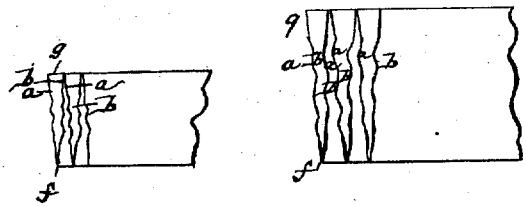

Figures 1 and 2 show nails of different lengths and sizes; Fig. 3, face views of plates, illustrating the cutting of the nails therefrom, and the manner in which I prefer to manufacture them; Fig. 4, an edge view.

In the drawings, A represents my improved nail. This nail has two flat sides, *a b*, opposite to and parallel, or substantially so, with each other, two edges, *c d*, opposite to each other, and continuous with the two flat sides *a b*, and these edges *c d* are corrugated or indented, as shown, along the length of the nail, a tapering point, *f*, at one end, and an enlarged head, *g*, at the other end, of the nail.

The corrugations or indentations of the nail-edges *c d* increase the hold of the nail, the enlarged head and corrugated edges prevent the nail from working through the sole toward the inside of the boot or shoe, and the tapering point clinches or rivets on an iron-plated last, or its equivalent, on the inside of the sole when the nail is driven, and thus prevents the nail from working toward the outside of the sole.

I prefer to cut these nails, one after another, from a strip or blank, as shown in Fig. 3, and to use a thin or flat blank, thus producing thin or flat-sided nails, which are advantageous, because, as the thickness of the nail is to be across the line about the boot or shoe sole where and along which the nails are to be driven, an increased number of nails can be driven in a given distance or space, and without materially diminishing the strength or flexibility of the boot or shoe sole.

The several figures of the drawing show the nail A as tapered on its edges *c d* from end to end, and this taper of the nail gives, obviously, additional advantages over those which have been hereinbefore recited.

Having now described my invention, what I claim, and desire to secure by Letters Patent, is—

1. As an article of manufacture, a nail having two flat opposite sides, *a b*, a clinching end, *f*, an enlarged head, and provided with edge corrugations.

2. A nail made from a flat metallic strip, and having the tapering or wedge-shaped head *g*, edge corrugations *c d*, and clinching-point *f*, substantially as herein shown and described.

H. T. MARSHALL.

Witnesses:

EDWIN W. BROWN,

GEO. H. EARL.